United States Patent
Hsiang et al.

(10) Patent No.: US 7,235,943 B2
(45) Date of Patent: Jun. 26, 2007

(54) SYSTEM AND METHOD FOR CONTROLLING THE ROTATING SPEED OF A FAN

(75) Inventors: Sung-Jen Hsiang, Guangdong (CN); Yuh-Ching Chang, Guangdong (CN); Chien-Yi Lo, Guangdong (CN); Puh-Yun Lee, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,973

(22) Filed: Jun. 1, 2006

(65) Prior Publication Data
US 2007/0081800 A1    Apr. 12, 2007

(30) Foreign Application Priority Data
Oct. 11, 2005    (CN) .................. 2005 1 0100396

(51) Int. Cl.
*G05D 23/00*    (2006.01)
(52) U.S. Cl. .................. 318/471; 165/104.33; 361/695
(58) Field of Classification Search ........... 318/268, 318/471; 388/934; 165/104.33; 361/687, 361/695, 106; 415/177; 700/299, 300
See application file for complete search history.

(56) References Cited

U.S. PATENT DOCUMENTS

| 6,470,289 | B1 * | 10/2002 | Peters et al. | ................. | 702/132 |
| 6,601,168 | B1 * | 7/2003 | Stancil et al. | ............... | 713/100 |
| 6,813,150 | B2 * | 11/2004 | King et al. | ................. | 361/687 |
| 6,906,901 | B1 * | 6/2005 | Liu | ............................ | 361/103 |
| 6,935,130 | B2 * | 8/2005 | Cheng et al. | .............. | 62/259.2 |
| 6,996,333 | B1 | 2/2006 | Lin | | |
| 7,167,778 | B2 * | 1/2007 | Yazawa et al. | ............ | 700/300 |

* cited by examiner

*Primary Examiner*—Bentsu Ro
(74) *Attorney, Agent, or Firm*—Winston Hsu

(57) ABSTRACT

A method for controlling the rotating speed of a fan is disclosed. The method includes the steps of: reading a standard temperature $T_c$ of a central processing unit (CPU); reading a thermal diode's temperature $T_d$ and a system ambient temperature $T_a$; comparing $T_d$ with a minimum temperature $T_l$, such that the fan begins processing the heat of the CPU begins; if $T_d>T_l$, increasing pulse-width modulation (PWM) duty cycle of the fan to 100%; if $T_d<=T_l$, comparing a critical temperature $T_0$ with $T_a$; if $T_a>T_0$, increasing PWM fan duty cycle to 100%; if $T_a<=T_0$, setting the fan duty cycle at 40%; sending the PWM fan duty cycle to a fan speed controller.

15 Claims, 4 Drawing Sheets

SYSTEM AND METHOD FOR CONTROLLING THE ROTATING SPEED OF A FAN

FIELD OF THE INVENTION

The present invention is generally related to a system and method for controlling the rotating speed of a fan.

DESCRIPTION OF RELATED ART

It is known that a central processing unit (CPU) of a computer generates heat while operating. The higher the operating speed of the CPU is, the higher the temperature is. A cooling device such as a fan is adopted to lower the temperature. When the temperature around the CPU is too high, the fan immediately starts rotating at a predetermined speed. When the temperature around the CPU is relatively low, the fan is stopped in order to save power. A fan speed control device, which has two types, namely, a mechanical type and an electronic type, controls the rotating speed of the fan.

Conventional mechanical type speed control devices commonly use a press-button switch or a rotary switch to control shift contacts of the fan motor. A user has to press the press-button switch or rotate the rotary switch to a desired speed position when changing the rotating speed of the fan. Conventional electronic fan speed control devices commonly include an electronic fan speed control circuit installed in the electronic circuit of the fan, and a touch-control or remote-control panel disposed at the base of the fan for enabling the user to drive the fan speed control circuit to change the rotating speed of the fan monitor. The conventional mechanical type and electronic type fan speed control devices are commonly complicated, resulting in a high manufacturing cost.

Therefore, what is needed is a system and method for controlling the rotating speed of a fan that can control the fan by software.

SUMMARY OF INVENTION

A system for controlling the rotating speed of a fan is provided in accordance with a preferred embodiment. The system typically includes a system ambient thermal spot, a fan speed controller, a temperature reading module, a comparison module and a processing module. The temperature reading module is used for reading a standard temperature value of a central processing unit (CPU), a temperature value of a thermal diode of the CPU, and a temperature value of the system ambient thermal spot. The comparison module is used for comparing the temperature value of the thermal diode with a minimum temperature value at which the fan begins to process the heat of the CPU, comparing the temperature value of the system ambient thermal spot with a critical temperature value if the temperature value of the thermal diode is not larger than the minimum temperature value, and obtaining comparison results. The processing module is used for setting pulse-width modulation (PWM) duty cycles of the fan according to the comparison results, and sending the duty cycles to the fan speed controller for controlling the rotating speed of the fan.

A method for controlling the rotating speed of a fan includes the steps of: reading a standard temperature value of the CPU; reading a temperature value of a thermal diode of the CPU and a temperature value of the system ambient thermal spot; comparing the temperature value of the thermal diode with a minimum temperature value at which the fan begins to process the heat of the CPU, and executing one of the steps of: (a) increasing the PWM duty cycle of the fan to 100% if the temperature value of the thermal diode is larger than the minimum temperature value; and (b) comparing the temperature value of the system ambient thermal spot with the critical temperature value if the temperature value of the thermal diode is not larger than the minimum temperature value, and executing one of the steps of: (1) increasing the PWM duty cycle of the fan to 100% if the temperature value of the system ambient thermal spot is larger than the critical temperature value; and (2) setting the PWM duty cycle to an optimal percentage if the temperature value of the system ambient thermal spot is not larger than the critical temperature value; and sending the PWM duty cycle to the fan speed controller in order to control the rotating speed of the fan.

Other systems, methods, features, and advantages of the present invention will be or become apparent to one with skill in the art upon examination of the following drawings and detailed description.

DETAILED DESCRIPTION

Figure 1:
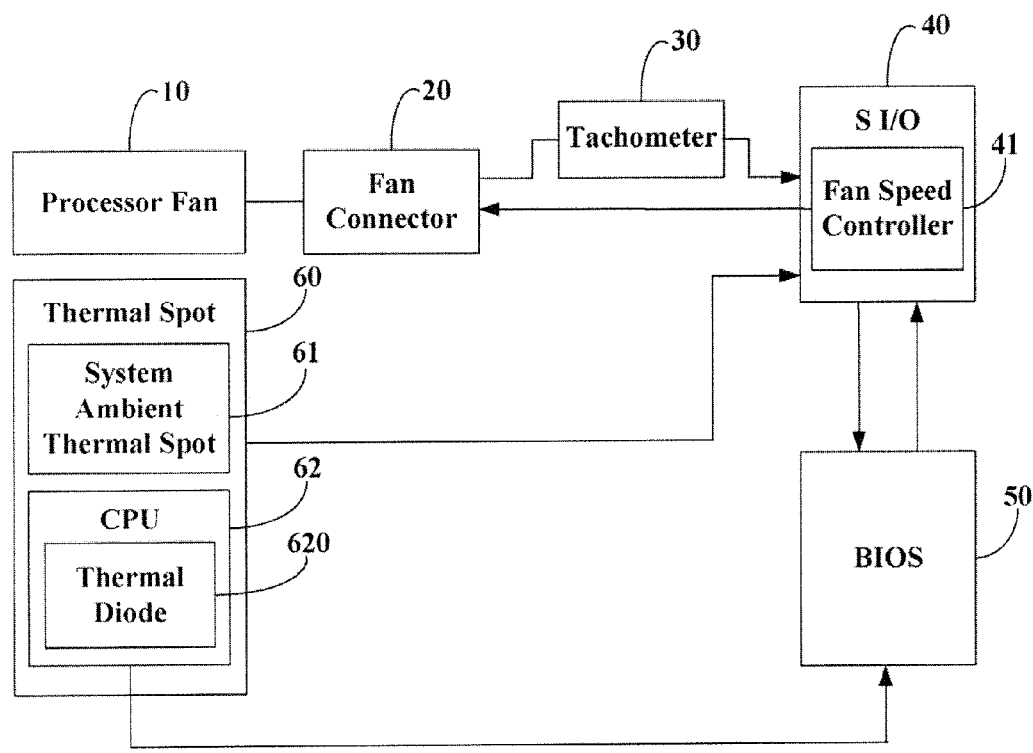
FIG. 1 is a hardware configuration schematic diagram of a system for controlling the rotating speed of a fan.

FIG. 1 is a hardware configuration schematic diagram of a system for controlling the rotating speed of a fan in accordance with one preferred embodiment. In the preferred embodiment, the system mainly includes: a fan 10 that is typically configured on a balanced technology extended (BTX) motherboard of a computer system, a fan connector 20, a tachometer 30, a super input/output (S I/O) 40, a basic input output system (BIOS) 50 and a thermal spot 60. The fan 10 may be a pulse-width modulation (PWM) fan. The fan connector 20 may be a four-pin fan connector or a five-pin fan connector. The tachometer 30 is connected with the fan 10 via the fan connector 20, and is used for recording the rotating speed of the fan 10. The S I/O 40 is used for sensing a temperature of the thermal spot 60, and converting the temperature into a temperature value $T_d$. The thermal spot 60 includes a system ambient thermal spot 61 and a central processing unit (CPU) 62. The system ambient thermal spot 61 includes a display card thermal spot and a memory thermal spot. The CPU 62 has a thermal diode 620 that is a center heat element. The S I/O 40 has a fan speed controller that is used for controlling the rotating speed of the fan 10.

Figure 2:
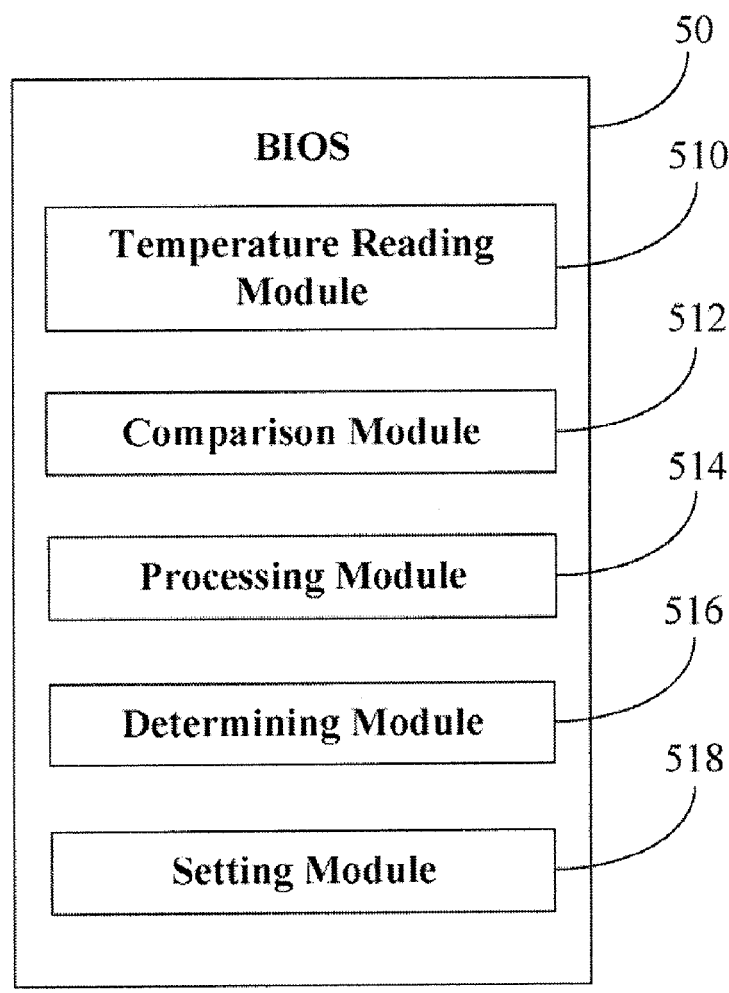
FIG. 2 is a schematic diagram of software function modules of the basic input output system (BIOS) of FIG. 1.

FIG. 2 is a schematic diagram of software function modules of the BIOS 50. On top of its common use, the BIOS 50 additionally includes a temperature reading module 510, a comparison module 512, a processing module 514, a determining module 516 and a setting module 518. The temperature reading module 510 is used for reading a standard temperature value $T_c$ of the CPU 62, a temperature value $T_d$ of the thermal diode 620 converted by the S I/O 40, and a temperature value $T_a$ of the system ambient thermal spot 61.

Different types of CPUs typically have different corresponding standard temperature values $T_c$. A range of the standard temperature value $T_c$ of different types of CPUs is between fifty degrees Centigrade and eighty degrees Centigrade, and an approximation error of the standard temperature value $T_c$ is about two degrees Centigrade. The temperature value $T_a$ includes the display card thermal spot temperature value and the memory thermal spot temperature value.

The comparison module 512 is used for comparing the temperature value $T_d$ with a minimum temperature value $T_I$, such that the fan begins processing the heat of the CPU 62. The minimum temperature value $T_I$ equals a temperature value (of which an optimal value is about ten degrees Centigrade) subtracted from the standard value $T_c$, namely $T_I=T_c-10°$ C. The comparison module 512 is further used for comparing the temperature value $T_a$ with a critical temperature value $T_0$ if $T_d<=T_I$. The critical temperature value $T_0$ equals to about forty-five degrees Centigrade. If $T_a>T_0$, the rotating speed of the fan 10 has to be increased quickly in order to keep the CPU 62 to continue working under normal working conditions.

The processing module 514 is used for setting PWM fan duty cycles according to the comparison results, and sending the PWM fan duty cycles to the fan speed controller 41 in order to control the rotating speed of the fan 10. The determining module 516 is used for determining whether there is a need to continue controlling the rotating speed of the fan 10. The setting module 518 is used for setting a fixed time period if there is the need to continue controlling the rotating speed of the fan 10.

Figure 3:
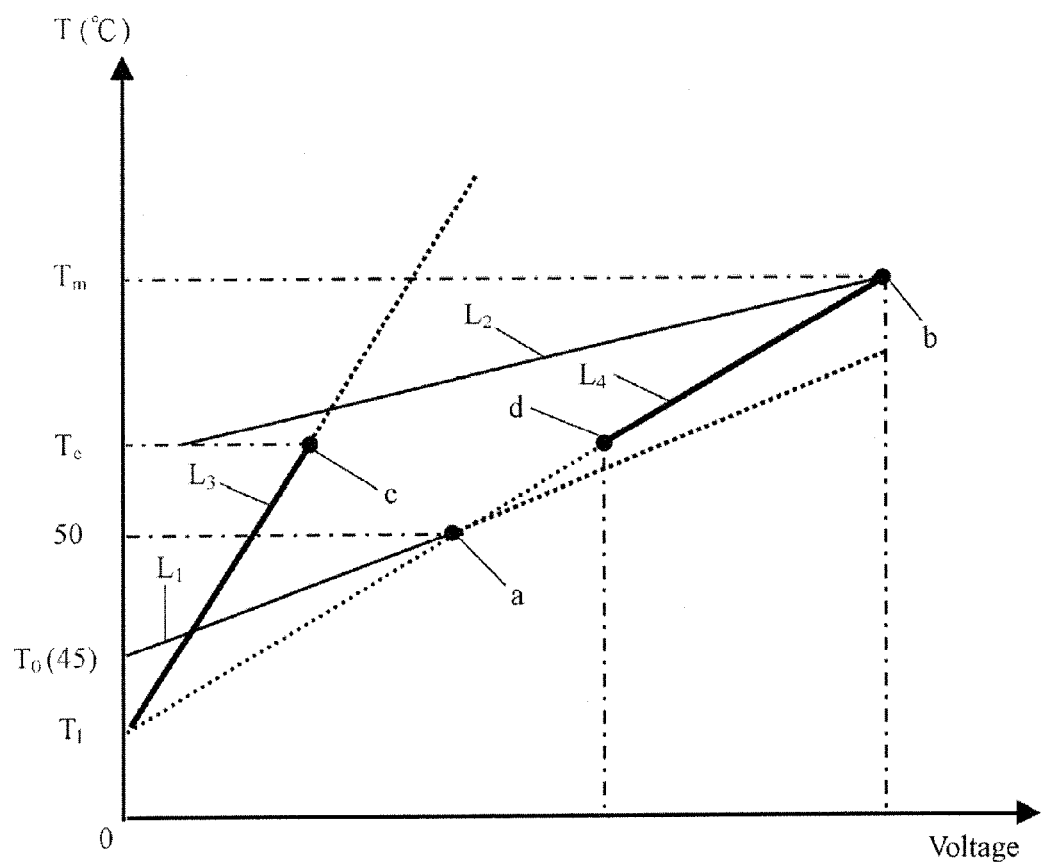
FIG. 3 is a thermal profile of a thermal diode and system ambient of the system for controlling the rotating speed of a fan of FIG. 1.

FIG. 3 is a thermal profile of the thermal diode 620 and system ambient of a system for controlling the rotating speed of the fan 10. $L_1$ represents the linear change between the voltage and the temperature value $T_a$ of the system ambient thermal spot 61 if the temperature value $T_a$ that the computer system begins temperature control equals to the critical temperature value $T_0$ (i.e., forty-five degrees Centigrade); if the temperature of the computer system equals to fifty degrees Centigrade (shown with dot a in FIG. 3), the processing module 514 sets the PWM fan duty cycle to 100%, and the fan 10 runs in a full speed.

$L_2$ represents the linear change between the voltage and the temperature value $T_d$ of the thermal diode 620 if $T_d>T_c$; if the temperature value $T_d$ of the thermal diode 620 equals to a maximum value $T_m$ (shown with dot b in FIG. 3), the fan 10 and the system stop running altogether.

$L_3$ represents the linear change between the voltage and the temperature value $T_d$ if the temperature value of the CPU 62 equals to the minimum temperature value $T_I$, such that the fan begins processing the heat of the CPU 62; if the temperature value $T_d$ of the thermal diode 620 approaches to the standard temperature value $T_c$ (shown with dot c in FIG. 3), the processing module 514 sets the PWM fan duty cycle to 100% and the fan 10 runs at the full speed.

$L_4$ represents the linear change between the voltage and the temperature value $T_d$ of the thermal diode 620 if the temperature value $T_d$ of the thermal diode 620 increases from the standard temperature value $T_c$ to the maximum value $T_m$; if the temperature value $T_d$ of the thermal diode 620 approaches to the standard temperature value $T_c$ (shown with dot d in FIG. 3), the processing module 514 sets the PWM fan duty cycle to 100% and the fan 10 runs at the full speed.

Figure 4:
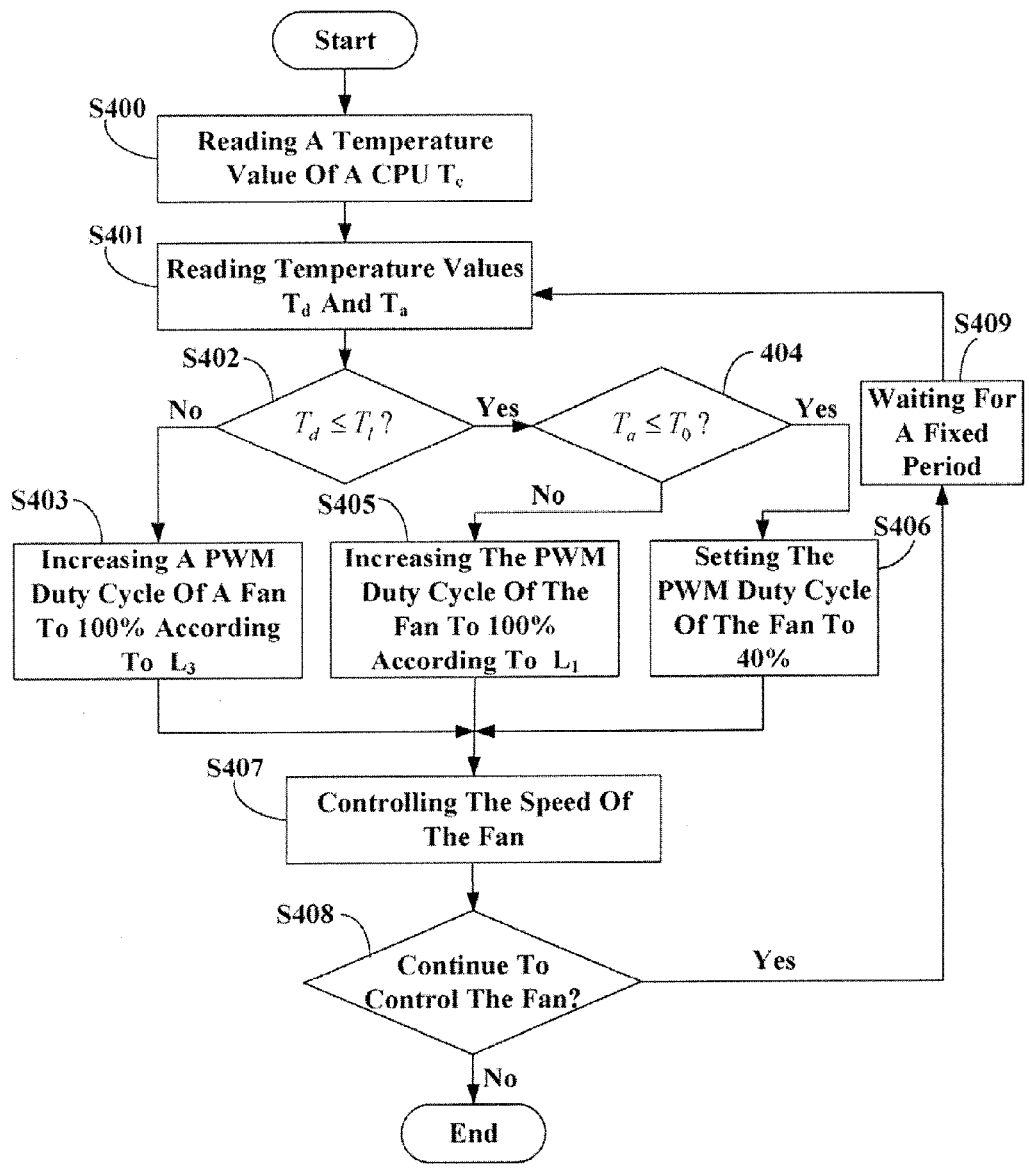
FIG. 4 is a flowchart of a preferred method for controlling the rotating speed of a fan in accordance with one preferred embodiment.

FIG. 4 is a flowchart of a preferred method for controlling the rotating speed of a fan. In step S400, the temperature reading module 510 reads the standard temperature value $T_c$ of the CPU 62. In step S401, the S I/O 40 senses the temperature of the thermal diode 620 and the temperature of the system ambient thermal spot 61, and converts the temperatures into temperature values $T_d$ and $T_a$ respectively, the temperature reading module 510 reads the temperature values $T_d$ and $T_a$.

In step S402, the comparison module 512 compares the temperature value $T_d$ with the minimum temperature value $T_I(T_I=T_C-10°$ C.) such that the fan begins processing the heat of the CPU 62, and obtains a comparison result. In step S403, the processing module 514 sets the PWM fan duty cycle to 100% according to the line L3 if the comparison result in step S402 is $T_d>T_I$, and the process goes directly to step S407.

In step S404, the comparison module 512 compares the temperature value $T_a$ with the critical temperature value $T_0$ (for example, the critical temperature value is about forty-five degrees Centigrade) if the comparison result in step S402 is $T_d<=T_I$. In step S405, the processing module 514 sets the PWM fan duty cycle to 100% according to the line $L_I$ if the comparison result in step S404 is $T_a>T_0$, and the process goes to step S407.

In step S406, the processing module 514 sets the PWM fan duty cycle to an optimal percentage (for example, the optimal percentage is about 40%) if the comparison results in step S404 is $T_a<=T_0$, and the process goes to step S407.

In step S407, the processing module 514 sends the comparison results to the fan speed controller 41 in order to control the rotating speed of the fan 10: if $T_d<=T_I$ and $T_a<=T_0$, the rotating speed of the fan 10 decreases in order to reduce noises generated by the fan 10; if the CPU 62 continues increasing work loads, the temperature value $T_d$ of the thermal diode 620 approaches to the standard temperature value $T_c$, and the fan speed controller 41 increases the rotating speed of the fan 10 in order to lower the temperature value $T_d$; if the PWM fan duty cycle is 100%, the fan 10 runs at the full speed.

In step S408, the determining module 518 determines whether there is a need to continue controlling the fan 10. In step S409, the user waits for a fixed time period and the process returns the step S401 if there is a need to continue controlling the fan 10. The fixed time period is set by the setting module 518.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for controlling the rotating speed of a fan, the system comprising:
    a system ambient thermal spot;
    a fan speed controller;
    a temperature reading module for reading a standard temperature value of a central processing unit (CPU), a temperature value of a thermal diode of the CPU, and a temperature value of the system ambient thermal spot;

a comparison module for comparing the temperature value of the thermal diode with a minimum temperature value such that the fan begins processing the heat of the CPU, comparing the temperature value of the system ambient thermal spot with a critical temperature value if the temperature value of the thermal diode is not larger than the minimum temperature value, and obtaining comparison results; and a processing module for setting pulse-width modulation (PWM) fan duty cycles of the fan according to the comparison results, and sending the duty cycles to the fan speed controller for controlling the rotating speed of the fan.

2. The system according to claim 1, wherein the system ambient thermal spot comprises a display card thermal spot and a memory thermal spot.

3. The system according to claim 1, wherein the minimum temperature value equals to a temperature value subtracted from the standard temperature value of the CPU.

4. The system according to claim 2, wherein the temperature value is ten degrees Centigrade.

5. The system according to claim 1, wherein the processing module setting the PWM fan duty cycles comprises:
setting the PWM fan duty cycle to 100% if the temperature value of the thermal diode is larger than the minimum temperature value;
setting the PWM fan duty cycle to 100% if the temperature value of the system ambient thermal spot is larger than the critical temperature value; and
setting the PWM fan duty cycle to an optimal percentage if the temperature value of the system ambient thermal spot is not larger than the critical temperature value.

6. The system according to claim 5, wherein the critical temperature value is forty-five degrees Centigrade.

7. The system according to claim 5, wherein the optimal percentage is 40%.

8. The system according to claim 5, wherein the fan runs at a full speed if the PWM fan duty cycle is set to 100%.

9. A method for controlling the rotating speed of a fan, the method comprising the steps of:
reading a standard temperature value of a central processing unit (CPU);
reading a temperature value of a thermal diode of the CPU and a temperature value of a system ambient thermal spot;
comparing the temperature value of the thermal diode with a minimum temperature value such that the fan begins processing the heat of the CPU, and executing one of the steps of:
increasing a pulse-width modulation (PWM) fan duty cycle of the fan to 100% if the temperature value of the thermal diode is larger than the minimum temperature value;
comparing the temperature value of the system ambient thermal spot with a critical temperature value if the temperature value of the thermal diode is not larger than the minimum temperature value, and executing one of the steps of:
increasing the PWM fan duty cycle of the fan to 100% if the temperature value of the system ambient thermal spot is larger than the critical temperature value; and
setting the PWM fan duty cycle to an optimal percentage if the temperature value of the system ambient thermal spot is not larger than the critical temperature value; and
sending the PWM fan duty cycle to a fan speed controller in order to control the rotating speed of the fan.

10. The method according to claim 9, wherein the system ambient thermal spot comprises a display card thermal spot and a memory thermal spot.

11. The method according to claim 9, wherein the minimum temperature value equals to a temperature value subtracted from the standard temperature value of the CPU.

12. The method according to claim 11, wherein the temperature value is ten degrees Centigrade.

13. The method according to claim 9, wherein the critical temperature value is forty-five degrees Centigrade.

14. The method according to claim 9, wherein the optimal percentage is 40%.

15. The method according to claim 9, wherein the fan runs at a full speed if the PWM duty circle is 100%.

* * * * *